Oct. 21, 1930.  H. H. SHUMAKER  1,778,917
GROOVE CLEANING MACHINE
Filed March 26, 1930  2 Sheets-Sheet 1

H. H. Shumaker,
Inventor

By C. A. Snow & Co.
Attorneys.

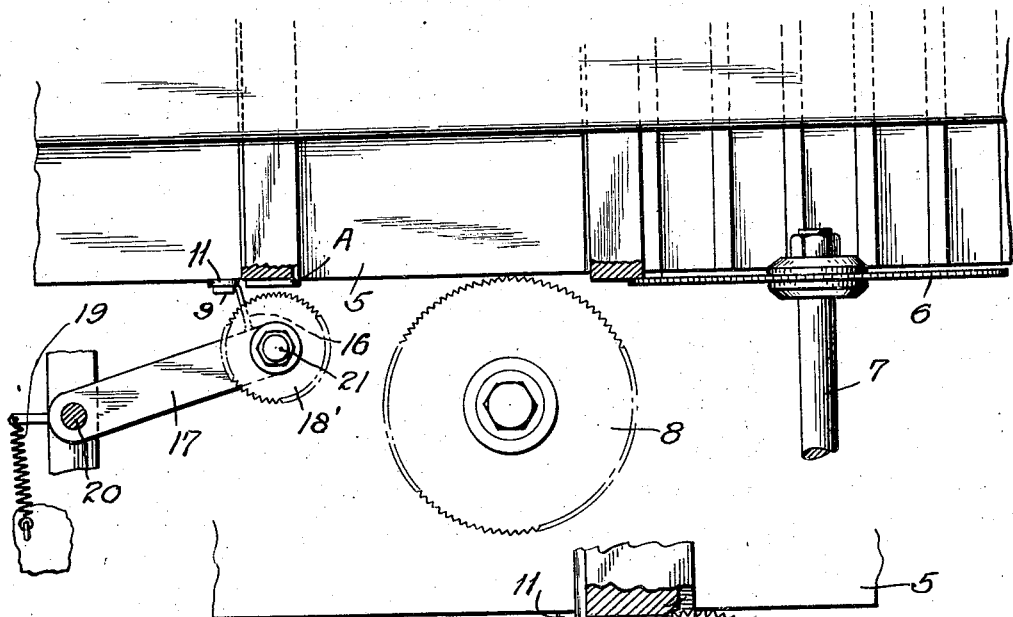
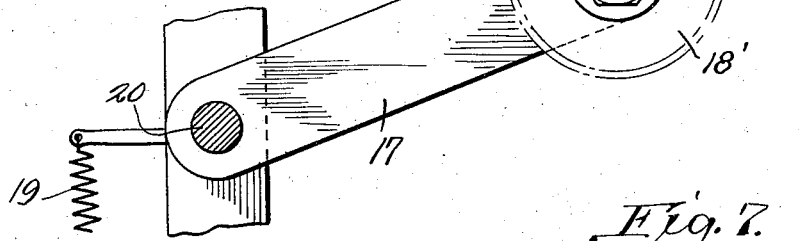
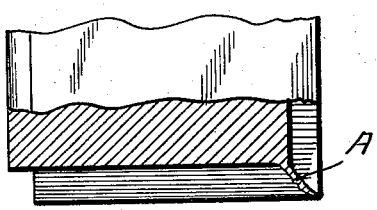
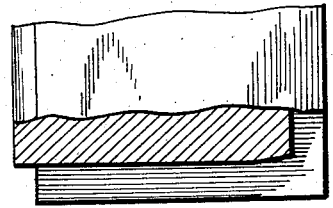

Patented Oct. 21, 1930

1,778,917

UNITED STATES PATENT OFFICE

HOWARD H. SHUMAKER, OF MEMPHIS, TENNESSEE

GROOVE-CLEANING MACHINE

Application filed March 26, 1930. Serial No. 439,155.

This invention relates to an attachment for sawing or end matching machines, the primary object of the invention being to provide means for cleaning the groove in the ends of boards after the trimming operation.

Another object of the invention is to provide means for removing the broken grain caused by the end grooving saw, so that the ends of flooring boards may be accurately matched, in the laying of a floor.

A still further object of the invention is to provide a cleaning saw of this character which will be automatic in its operation, and one which will be operated by the stock passing away from the trimming saw.

With the foregoing and other objects in view, which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawings:

Figure 2 is a plan view thereof.

Figure 5 is a plan view illustrating the cleaning saw in its active position.

Figure 6 is a view illustrating an end of a board after it has been grooved.

Figure 7 is a view of the board after the broken grain has been removed by the cleaning saw.

Figure 1:
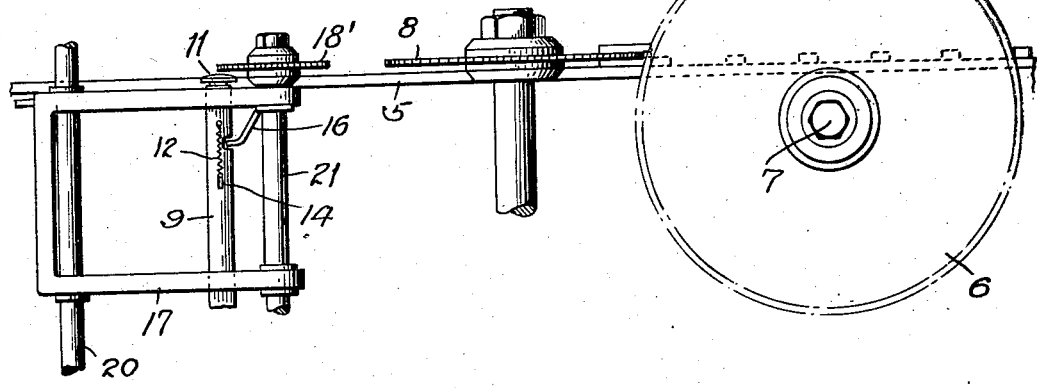
Figure 1 is an elevational view of a trimming machine equipped with a cleaning saw, constructed in accordance with the invention.
Figures 3, 4:
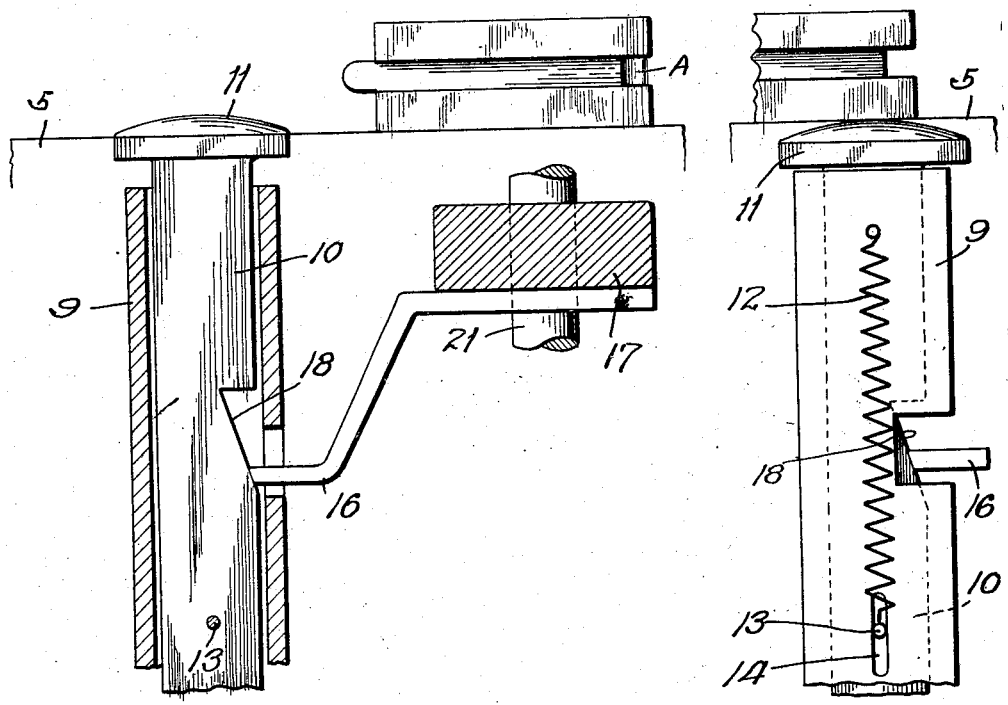
Figure 3 is an enlarged sectional view illustrating the operating means for the cleaning saw.
Figure 4 is a view illustrating the cleaning saw operating means as forced downwardly by the stock passing thereover.

Referring to the drawings in detail, the reference character 5 designates the usual saw table of a flooring trimming saw, over which the stock is moved during the trimming operation. The reference character 6 designates the trimming saw, which is operated in the usual and well known manner, the trimming saw being mounted on the shaft 7.

Disposed adjacent to the saw 6, is a stock end grooving saw 8 that operates in a horizontal plane, so that the stock as it is fed through the machine, will be moved into engagement with the saw to form the groove in the end of the stock.

Arranged near the table 5, is a supporting member and guide 9 in which the vertically movable shank 10 is moved, the shank 10 being provided with a head 11 at its upper end. This head 11 is slightly curved and extends above the surface of the table 5 at a point in the path of travel of the stock passing through the machine.

A coiled spring 12 has one of its ends anchored to the member 9, the opposite end thereof being secured to the shank 10, by means of the pin 13 which extends through the elongated opening 14 of the supporting member. An arm 16 extends laterally from the frame 17 on which the cleaning saw 18' is mounted.

The extremity of the arm 16 is beveled and engages the inclined surface 18 of the notch formed in one edge of the shank 10. Thus it will be seen that as the shank 10 moves downwardly, the arm 16 will follow the inclined surface 18, permitting the frame 17 to swing inwardly. A coiled spring 19 has connection with the frame 17 and acts to draw the frame inwardly to bring the saw 18' to its proper cutting position to remove the broken grain, indicated by the reference character A in Figure 6 of the drawings, leaving the groove clean.

The frame 17 is pivotally mounted on the shaft 20 in such a way that swinging movement of the frame will be permitted.

It is of course understood that the saw 18' is mounted on the upper end of the shaft 21, which receives its motion through the medium of a belt operating over a suitable power pulley not shown.

In the operation of the device the stock is fed over the table 5 of the saw machine, in the usual and well known manner, whereupon the saw 6 trims the ends of the stock, and the saw 8 grooves the ends of the stock.

As the stock continues on its passage through the machine, the stock engages the head 11 of the shank 10, forcing the shank downwardly allowing the arm 16 to follow the inclined surface 18, under the action of the coiled spring 19, whereupon the saw 18′ will engage the broken grain A and remove it.

As soon as the stock passes the head 11, the action of the coiled spring 12 returns the head to its elevated position to be engaged by the next board or stock passing through the machine, the operation being repeated.

I claim:

1. In combination with an end trimming and grooving machine, a pivoted frame mounted on the machine, an end groove cleaning saw mounted on the frame, a vertically movable shank for controlling the movements of the frame to move the end groove cleaning saw into and out of operation, and said shank being operated by the action of the stock passing through the machine.

2. In combination with a trimming and end grooving machine, a pivoted frame, a groove cleaning saw mounted on the frame, an arm extending from the frame, a vertically movable shank having a cut away portion defining an inclined surface against which the arm moves, means for moving the frame in one direction to bring the saw to its active position, and a head on the upper end of the shank lying in the path of travel of the stock passing through the machine, to move the shank.

3. In combination with a wood sawing machine, a guide, a vertically movable shank operating within the guide, a pivoted arm controlled by the movement of the shank, a saw carried by the pivoted frame and adapted to move into engagement with the stock adjacent to one edge of the stock, and said shank extending above the machine to be engaged by stock passing through the machine to operate the shank and pivoted frame.

In testimony that I claim the foregoing as my own, I have hereto affixed my signature.

HOWARD H. SHUMAKER.